Figure 1:
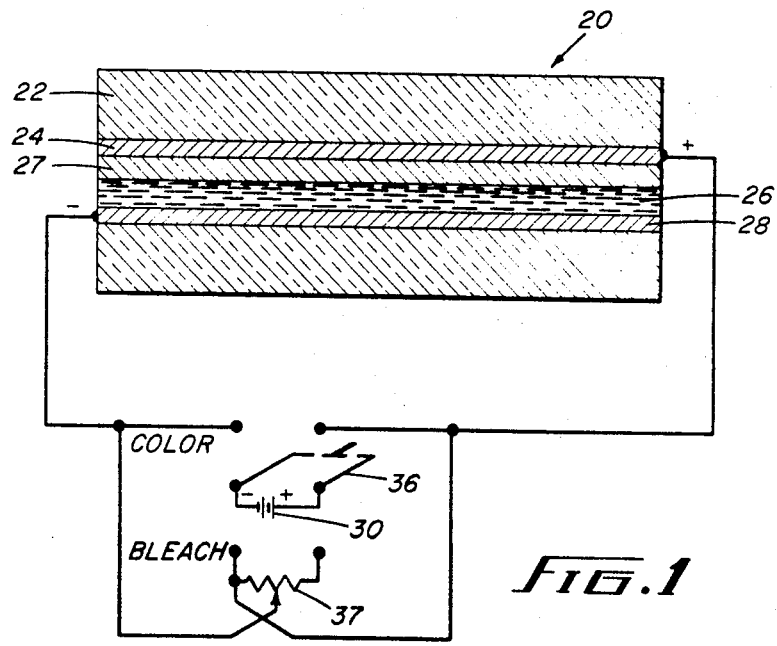

OR 3,712,710

United States
Castellion et al.

[11] 3,712,710
[45] Jan. 23, 1973

[54] SOLID STATE ELECTROCHROMIC MIRROR

[75] Inventors: George Augustus Castellion, Stamford; Donald Paul Spitzer, Riverside, both of Conn.

[73] Assignee: American Cyanamid Company, Stamford, Conn.

[22] Filed: Dec. 21, 1970

[21] Appl. No.: 99,909

[52] U.S. Cl. ..................................................350/160
[51] Int. Cl. .................................................G02f 1/36
[58] Field of Search........................................350/160

[56] References Cited
UNITED STATES PATENTS 3,578,843  5/1971  Castellion............................350/160
3,521,941  7/1970  Deb et al.............................350/160

*Primary Examiner*—William L. Sikes
*Attorney*—Charles J. Fickey

[57] ABSTRACT

Electro-optical device particularly useful in the modulation of reflected light typically comprising an electrochromic device containing a reflecting layer electrode in sandwiched arrangement, said electrochromic device being a sandwich arrangement of a transparent electrode, a reflecting layer electrode, a film of a transition metal compound and a solid insulating film disposed between the electrodes. The electrochromic device exhibits coloration and bleaching thereof at ambient temperature by control of the polarity of an applied electric field, whereby light reaching the reflecting solid layer electrode is modulated in intensity, thus modulating, in turn, the reflected light.

8 Claims, 3 Drawing Figures

INVENTORS.
GEORGE AUGUSTUS CASTELLION
DONALD PAUL SPITZER

BY
Charles J. Hickey
ATTORNEY

SOLID STATE ELECTROCHROMIC MIRROR

BACKGROUND OF THE INVENTION

In our copending, application, Ser. No. 622,822, filed Feb. 7, 1967 and now abandoned, there are described electro-optical devices exhibiting a phenomenon known as "persistent electrochromism." This term denotes the property of a material, whereby its electromagnetic radiation absorption characteristic is altered at ambient temperature under the influence of an electric field. Such materials as for example, tungsten oxide and molybdenum oxide may exhibit little or no absorption of visible wavelengths in the absence of an electric field and, therefore, are transparent. When subjected to an electric field, however, they effectively absorb in the red end of the spectrum, turning blue in color. If the electrodes and the electrochromic layer are formed on the surface of a transparent substrate, such as glass, or clear acrylic resin, the light transmitting characteristics of the combination can be varied by controlling the electric field produced across the electrochromic layer. Thus, if the "sandwich" of electrodes and electrochromic material on the substrate originally is clear, application of a voltage across the electrodes to establish an electric field of the proper polarity changes the light absorption characteristic of the electrochromic material, turning it darker for example, thus decreasing the light transmitting ability of the entire assembly.

As further described in our copending U.S. application, Ser. No. 773,690, filed Sept. 25, 1968 and now abandoned, when an additional layer of solid state material such as silicon oxide or calcium fluoride characterized as a current carrier permeable insulator is placed between one of the electrodes and the electrochromic material it not only permits the absorption characteristic of the electrochromic material to change rapidly under the influence of an electric field of a given polarity but it also renders the electrochromic layer sensitive to a field of the opposite polarity to return it positively to the absorption rate it occupied prior to the initial application of the field. This concept was applied in the control of light reflected from a mirror.

While the mirror device of the foregoing disclosure functioned satisfactorily it had a relatively limited service life since the current carrier permeable insulator was not chemically and electrochemically matched to the counterelectrode in contact therewith. If such service life could be extended for an indefinite period of time such a solution would fulfill a long felt need in the art.

The device of the present disclosure overcomes the deficiency of the prior art device by employing a β alumina insulating material chemically and electrochemically compatible with an alkali metal counterelectrode incorporating a mirror surface as a integral part of the counterelectrode in a sealed system.

Unexpectedly, the result of this combination of a mirror electrode element in direct contact with a compatible insulator material extends expected service life indefinitely.

SUMMARY OF THE INVENTION

It is a principal object of this invention to provide a solid state reflecting device for modulating reflected light.

Another object of the present invention is to provide an improved form of electro-optical light modulating device wherein a current carrier permeable insulator can be placed directly in contact with a reflecting counterelectrode layer so as to provide prolonged service life in a sealed unit for rapid and even coloration at low applied potential.

A further object of the invention is to provide a solid state light reflecting device having infinitely variable light modulation ability.

Briefly stated, the device of the present invention comprises in sandwich arrangement, a transparent electrode, a persistent electrochromic layer, a current carrier permeable insulator and a reflecting electrode additionally serving as a mirror layer. In operation, when the device of the present invention is placed in an electric circuit with the transparent electrode negative and the reflecting electrode positive, the electrochromic layer will become colored. Thus, the amount of light reaching the reflecting surface from the side of the transparent electrode and being reflected back will be reduced. Reversing the circuit polarity will cause the electrochromic layer to bleach to the colorless state, thus increasing the reflected light from the reflecting surface to its original intensity.

Figures 2, 3:
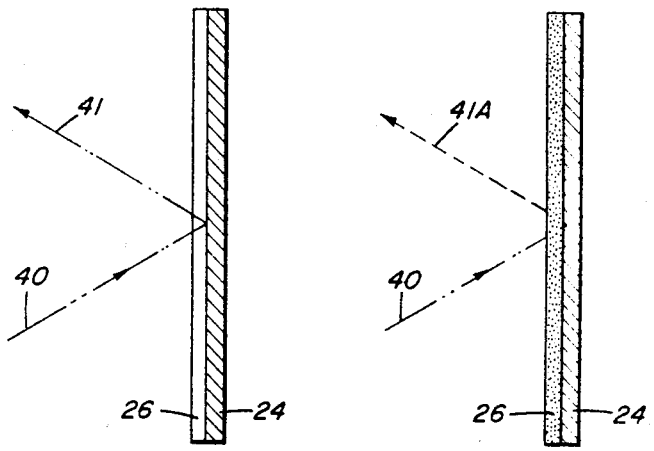

The foregoing and other features, objects and advantages of the present invention will become more apparent from the following detailed description thereof taken in conjunction with the accompanying drawings in which:

FIG. 1 is an illustration, partly in cross-section, of an electro-optical device of the present invention, type described and claimed in the foregoing earlier applications; and FIGS. 2 and 3 are diagrammatic illustrations of the inventive device in the modulation of reflected radiation.

In the description herein the device of the present invention is described in terms of its effect on visible light transmission characteristics, i.e., the variation in the wavelength absorption of the electrochromic material within the visible region of the spectrum. It will, of course, be recognized that the phenomenon exhibited by the type of materials to be described is not limited to the visible spectrum but may extended into the invisible regions.

ELECTROCHROMIC MATERIALS

As a critical element of the device defined hereinafter, there is employed a "persistent electrochromic material." It is defined as a material responsive to the application of an electric field of a given polarity to change from a first persistent state in which it is essentially non-absorptive of electromagnetic radiation in a given wavelength region to a second persistent state in which it is absorptive of electromagnetic radiation in the given wavelength region. Once in said latter state, said persistent electrochromic material is responsive to the application of an electric field of the opposite polarity to return to its original state. Certain of such materials can also be responsive to a short circuiting condition, in the absence of an electric field, so as to return to the initial state.

By "persistent" is further meant the ability of the material to remain in the absorptive state to which it is changed, after removal of the electric field, as distinguished from a substantially instantaneous reversion to the initial state, as in the case of the well-known Franz-Keldysh effect.

The materials which form the electrochromic materials of the device in general are electrical insulators or semiconductors. Thus are excluded those metals, metal alloys, and other metal-containing compounds which are relatively good electrical conductors.

While not wholly understood, it appears that the materials contain in non-stoichiometric proportions at least two different elements, said elements being present as ions of opposite polarity. This condition produces lattice defects as distingusihed from mere physical displacement of crystal symmetry, although the condition may also result in or be evidenced by such. Lattice vacancies are particular instances of lattice defects as, for example, an oxygen vacancy in a metal oxide crystal.

Two classes of electrochromic materials may be distinguished which satisfy the foregoing conditions and are therefore useful in the device of the present invention. The first and preferred class (I) comprises materials disclosed in the above-mentioned prior patent application. These materials exhibit persistent electrochromism over a wide temperature range including ambient temperature and in some instances high temperatures, e.g., above about 125°C. or low temperatures, e.g., below about −50°C. By "ambient temperature" is meant temperatures normally encountered in the fields of use of the devices such as described hereinafter, e.g., −50°C. to 125°C.

The second class (II), comprises materials which exhibit persistent electrochromism only at relatively high (nonambient) temperature, e.g., above about 125°C. Examples of these materials are gross crystals or crystalline layers or films of alkali halides such as NaCl, RbCl, KCl, LiF, NaBr, KBr, KI, RbBr, and the like, as described in British Pat. No. 845,053 and corresponding West German Pat. No. 1,036,388. Combinations of class (I) and class (II) materials may also be employed.

The class (I) materials are further characterized as inorganic substances which are solid under the conditions of use, whether as pure elements, alloys, or chemical compounds, containing at least one element of the Periodic System which can exist in more than one oxidation state in addition to zero. The term "oxidation state" as employed herein is defined in "Inorganic Chemistry," T. Moeller, John Wiley and Sons, Inc., New York, 1952. These include materials containing a transition metal element (including Lanthanide and Actinide series elements); materials containing non-alkali metal elements such as copper, tin and barium; and materials containing an alkali metal element with a variable oxidation state element. Preferred materials of this class are films of transition metal compounds in which the transition metal may exist in any oxidation state from +2 to +8. Examples of these are: transition metal oxides, transition metal sulfides, transition metal oxysulfides, transition metal halides, selenides, tellurides, chromates, molybdates, tungstates, vanadates, niobates, tantalates, titanates, stannates, and the like. Particularly preferred are films of metal stannates, oxides and sulfides of the metals of Groups IVB, VB and VIB of the Periodic System, and Lanthanide series metal oxides and sulfides. Examples of such are copper stannate, tungsten oxide, molybdenum oxide, cobalt tungstate, metal molybdates, metal titanates, metal niobates, and the like.

The class (I) electrochromic materials are distinguished from prior known organic or inorganic materials which exhibit coloration in an electric field as a result of the Franz-Keldysh effect or the effect Platt describes as "electrochromism." As to Platt, see J. Chem. Phys. 34, 862-3 (1961). In the latter cases, coloration results from the shifting of an existing absorption band or spectral line by the electric field; whereas in the present invention, upon coloration, an absorption band is created where none existed before, or removed upon bleachinG.

An important advantage of devices of the invention containing a class (I) persistent electrochromic material is operability at ambient temperature. So far as is known, this is the first instance of electrochromic behavior at temperatures of practical application. The invention, therefore, permits numerous practical applications to which prior art electro-optical devices are not susceptible as will be evident from the ensuing description.

When the persistent electrochromic materials are employed as films, thickness desirably will be in the range of from about 0.1–100 microns. However, since a small potential will provide an enormous field strength across very thin films, the latter, i.e., 0.1–10 microns, are preferred over thicker ones. Optimum thickness will also be determined by the nature of the particular compounds being laid down as films and by the film-forming method since the particular compound and film-forming method may place physical (e.g., non-uniform film surface) and economic limitations on manufacture of the devices.

The films may be self-supporting, depending on thickness and film material, or may be laid down on any substrate which, relative to the film, is electrically non-conducting. Suitable substrate materials include glass, wood, paper, plastics, plaster, and the like, including transparent, translucent, opaque or other optical quality materials.

The preferred electrochromic material for use with the insulating layer is a class (I) material as defined above. However, the performance of class (II) electrochromic materials is also improved since the electrochromic material is made polarity sensitive thereby, that is, responsive to a field of one polarity but not to both at the same time as in the prior art device of British Pat. No. 845,053.

INSULATING LAYER

The insulating layer may be defined as a "current carrier permeable insulator" and as used herein is intended to denote any material of electrical resistivity sufficient to provide continuous effective insulation against normal electrical conduction between opposed surfaces of the electrodes. Numerous well-known solid state materials are suitable for use as current carrier permeable insulators in this invention. These include inorganic compounds of groups IA, IIA, and IIIA elements such as alkali oxide, alkaline earth oxides and alumina.

The insulating layer of the present disclosure generally comprises mixed alkali and alkaline earth metal oxides such as sodium oxide, potassium oxide and magnesium oxide in combination with aluminum oxide. As to these materials see J. Inorganic and Nuclear Chem 29 2453-2475 (1969). Beta alumina, $Na_2O \cdot 11Al_2O_3$, is a preferred insulating material because of its ease of handling and commercial availability. Suitable current carrier permeable insulators are additionally characterized as colorless solid ionic conductors having bulk ionic conductivities greater than $10^{-6}$/ohm/cm which permit the passage of only the ion wanted. Furthermore, such materials must be chemically stable and electrochemically compatible with the materials of the mirror electrode.

Preferably the insulator is a film of at least 1.0 micron thickness, for example, in the range of about 1.0 to 20.0 microns.

The mechanism by which the current carrier permeable insulator improves the performance of the persistent electrochromic material can be understood as a selective introduction of charge carriers (i.e., electrons, holes, positive or negative ions) suitable for the subsequent production of persistent coloration in the electrochromic material. The current carrier permeable insulator thereby renders the electrochromic material polarity sensitive, with the result that application of a voltage of polarity opposite that which produces coloration will result in bleaching without simultaneous recoloration.

This general mechanism may be viewed more particularly as two cases or theories, electronic and ionic. Each case explains certain observations not adequately explained by the other case, and it is not altogether implausible that the mechanisms, may operate simultaneously although independently.

In a first or electronic case, the current carrier permeable insulator functions by non-classical transposition (tunneling) of electrons or holes through the energy barrier junction between the insulator and the persistent electrochromic material. An equivalent characterization of such insulator materials in this view is that they exhibit an energy gap between their valence and conduction bands of width sufficient at the temperature of use to impede normal electrical conduction through the material of the insulator but nevertheless, because of their thinness, permit quantum mechanical tunneling of current carriers, i.e., electrons or holes, The current carriers which are injected by the tunneling process through the insulator into the persistent electrochromic material possess sufficient energy to become trapped in the energy level sites which produce the color centers observed as the coloration of the persistent electrochromic material. In order to maintain approximate charge neutrality in the persistent electrochromic layer, carriers of sign opposite to that of carriers which tunnel through the insulating layer must enter from the electrode opposite the electrode adjacent the insulating layer. During bleaching, either by shortcircuiting or by imposition of a voltage opposite that of the voltage which produces coloration, the charge carriers are removed or permitted to recombine through the external circuit, emptying the carriers from their traps and thus restoring the color centers to their original colorless condition. Coloration cannot occur under the condition of reverse voltage because the current carrier permeable insulator is not adjacent the electrode of polarity suitable for the tunneling and injection phenomenon.

Alternatively, as a second case, the current carrier permeable insulator can serve to block entirely the passage of an electronic current (i.e., electrons or holes) but permit the transfer through it of ions. In such case, the insulator serves to facilitate the production of color centers in the persistent electrochromic layer by providing a large electric field gradient through which ions may move rapidly, even at ambient temperature, to be removed or added to the persistent electrochromic material. In this situation, the insulator layer can also serve as a temporary or permanent repository for ions removed from the electrochromic layer.

Whether or not these theories are ultimately proven to govern in the present invention, the devices described herein achieve the coloration and bleaching capabilities indicated.

ELECTRODES

A large variety of materials exhibiting electrical conductivity and light transmission and reflection characteristics may be used for electrodes. The same material may be used for both electrodes or each electrode may be of a different material, or mixture of alloys of different material. Typical electrode materials are the metals, e.g., sodium, potassium, lithium and rubidium and conducting non-metals such as suitably doped tin or indium oxide and the like. One of the electrodes should be of an optical quality effective for transmission of the electrochromic change, if in the visible or for instrumentally sensing the change, if not in the visible range. The other electrode should be of reflecting quality effective as a mirror surface for visible light. Additionally, this mirror electrode should be chemically and electrochemically matched with the current carrying semipermeable insulating layer.

The mirror films are self supporting, depending on thickness and film material or are laid down on any substrate which relative to the film is electrically nonconducting and chemically inert. Suitable substrate materials include glass, plastics and the like, including transparent, translucent, opaque or other optical quality materials.

Turning now to the drawings, FIG. 1 illustrates a view in cross section of a device 20 in accordance with the invention. On a substrate 22 such as glass or other transparent material, are successively deposited layers of a conductive and reflecting material 24, an insulating material 27, a persistent electrochromic material 26, and a second conductive material 28. The conductive material 28 is of optical quality effective for passing light to reflecting electrode layer 24. The substrate 22 and the conductive layer 24 may conveniently be provided as a unit by a front surfaced sodium mirror. The reflecting electrode 24 may be any known material which will reflect light such as sodium and potassium metal film and is compatible to the insulating material. The layers 27 and 26 may then be deposited on the sodium mirror layer by known vacuum deposition or sputtering techniques. The persistent electrochromic material may be tungsten oxide or molybdenum oxide. The outer electrode 28 may conveniently be provided as a unit by so-called "NESA" glass, a commercially available product having a transparent coating of conductive tin oxide on one surface of a glass sheet. A source of DC potential 30 is coupled between the conductive films with its positive terminal on the sodium layer and its negative terminal on the tin oxide outer layer.

The negative and positive electrodes need only be in electrical contact with the film. Any type and arrangement of electrodes and film effective to impose an electric field on the film when the electrodes are connected to a voltage source, will be suitable. Thus, the electrodes may be spaced conducting strips deposited on or inbedded in the film, or preferably they may be conducting layers between which the film is inserted.

The device functions effectively in a reversible manner. For this purpose, the battery 30 is coupled to the electrodes 24 and 28 through a reversing switch indicated generally at 36. As shown, with the switch arm in the position to produce coloration, the positive terminal of the source is connected to the inner or sodium electrode while the negative terminal is connected to the tin oxide layer on the glass substrate.

Once complete coloration is induced, which in a typical case is a matter of seconds, the switch 36 may be opened, disconnecting the battery from the device entirely, and the device will remain in its darkened state without further application of power.

To bleach or erase a previously darkened surface, the switch arm is thrown to the "bleach" contacts, across which is connected a potentiometer 37. As shown, the potentiometer contact or slider is movable from a point at which the electrodes 24 and 28 are short circuited to a point at which full battery voltage, of polarity opposite to the coloration condition, is applied between them. Any number of reverse voltage values may be obtained between the two extremes.

In the position illustrated in the drawing, a "bleach" voltage of a value less than battery voltage is applied across the electrodes, setting up a corresponding electric field. Under the influence of this field, the device returns to its initial uncolored state. The rapidity with which the bleaching occurs is determined by the magnitude of the voltage; the higher the voltage; the faster the bleaching process is completed. At the higher bleaching voltages, it has been found that the bleaching process is even faster than the coloring operation. Once the bleaching is completed, no further coloration is observed with this polarity and the switch may be opened to disconnect the battery from the device and minimize power drain.

It has also been found that, notwithstanding the absence of an electric field, when the potentiometer is in its short circuiting position, certain of the persistent electrochromic materials nevertheless will return completely and positively to the initial state. The rate at which the bleaching occurs, however, is somewhat slower than when the material is subjected to an electric field.

Thus, the device of FIG. 1 functions as a self-contained modulator for reflected light. As shown in FIG. 2, a light ray 40 is reflected as a substantially full intensity ray 41 when the device 20 is in a bleached state. When the device is colored, as shown in FIG. 3, the amount of light from ray 40 passing through the colored electrochromic layer 26 to the reflecting layer 24 and from the reflecting layer is less due to absorption. Thus the reflected ray 41A, is lower in intensity. The difference in intensity may be varied as desired by controlling the density of coloration of electrochromic layer 26. The coloration is a function of the time that the current is applied, up to a certain maximum coloration. Thus if the current is applied for any time interval less than that required to obtain maximum coloration, a lesser amount of coloration will be obtained which will absorb less light, giving more reflected light. The amount of reflected light may thus be varied from the total, to any amount down to the minimum allowed.

Moreover, when the coloration current is cut off, the state of coloration reached at that point persists and does not require constant application of current to be maintained.

As will be apparent from the specific examples to be described below, many combinations of persistent electrochromic materials, insulating materials and electrode materials may be employed in accordance with the present invention.

EXAMPLE 1

A film of molybdenum oxide, about 1.0 micron in thickness, is thermally evaporated by conventional means at a pressure of $10^{-5}$ Torr. from an electrically heated tantalum boat onto the tin oxide coated side of "NESA" glass, the tin oxide on the glass forming the transparent electrode. A film of $Na_2O \cdot 11Al_2O_3$ (about 3 microns thick) forming an insulating material, is then deposited by sputtering onto the molybdenum oxide layer. Finally, a layer of sodium (about 0.5 micron thick) effectively reflecting is deposited over the $Na_2O \cdot 11Al_2O_3$ insulating layer to form the second electrode and mirror surface of the layered structure or sandWich.

During the several stages of evaporation and sputtering appropriate masking is effected to expose a portion of the tin oxide layer for attachment of the conductor, and also to extend the sodium layer so that a portion of it is directly on an uncoated portion of the glass substrate, minimizing the danger of shorting through to the tin oxide layer when the conductor is attached to the sodium electrode.

When an electric field of from 1 to 3 volts is applied across the foregoing sandwich structure with the sodium layer as the positive electrode and the tin oxide as the negative electrode, the molybdenum oxide film, normally colorless, is colored blue uniformly over the entire surface, reducing the reflected light transmission of the device to about 10 percent in 30 seconds. The coloration remains substantially permanent when the electric field iS removed.

When an electric field of reverse polarity is applied, i.e., positive potential on the tin oxide layer and negative potential on the sodium layer, the coloration fades uniformly and completely to restore the initial reflected light transmission of the sandwich. This occurs somewhat faster than the coloration, taking about 6 to 15 seconds, but can be varied by changing the value of potential.

EXAMPLE 2

The deVice is fabricated as described in connection with Example 1 except that a potassium oxide β-alumina insulating layer and potassium mirror is substituted for the $Na_2O \cdot 11Al_2O_3$ insulating layer — sodium mirror system. Application of 2 to 3 volts between the electrodes, with the sodium electrode positive, reduces the reflected light transmission of the device to 4 percent in about 2 minutes. Reversal of the polarity for approximately 15 seconds restores the full light transmission capability. It has been found that with the molybdenum oxide film, bleaching also occurs, but more slowly, when the electrodes are short circuited. A very gradual, i.e., over a span of several hours, bleaching occurs also with the field removed and the electrodes open circuited.

EXAMPLES 3–12

Table I below illustrates other combinations of insulation materials and mirror electrode materials which when supported as films substantially as described in Examples 1 and 2 exhibit the reflected radiation transmission characteristics of the invention.

TABLE I

| Example | Insulation Material | Mirror Electrode |
|---|---|---|
| 3 | $Na_2O \cdot 11Al_2O_3$ | potassium |
| 4 | $2Na_2O \cdot 11Al_2O_3$ | sodium |
| 5 | $K_2O \cdot 11Al_2O_3$ | sodium |
| 6 | $2K_2O \cdot 11Al_2O_3$ | potassium |
| 7 | $Na_2O \cdot 11Al_2O_3$ | sodium-potassium alloy |
| 8 | $Na_2O \cdot 11Al_2O_3$ | sodium-mercury amalgam |
| 9 | $2L_{12}O_3 \cdot 11Al_2O_3$ | sodium |
| 10 | $Na_2O \cdot MgO \cdot 5Al_2O_3$ | sodium-mercury amalgam |
| 11 | $K_2O \cdot MgO \cdot 5Al_2O_3$ | potassium-mercury amalgam |
| 12 | $Na_2O \cdot MgO \cdot 5Al_2O_3$ | sodium-potassium alloy |

Other combinations of the materials discussed above may be employed to vary the final characteristics of the overall device, i.e., the percentage change in light transmission capability, the voltage required to establish the requisite field strength, the time for the change to occur, etc. The depth of coloration is also dependent upon the thickness of the persistent electrochromic layer. In theory, it would seem that the thicker the layer, the more color centers would be formed upon application of the electric field and therefore deeper coloration could be expected. However, since thin layers could be expected to color more quickly in some cases, the relationship between thickness of the layers and depth of color is not simple.

The inventive device can be useful in many ways. It can be used as part of an optical system involving reflective elements where close control of light intensity is desired without modifying its other properties. Thus no diaphragams or other separate light modulating elements would be necessary. Moreover, the optics may be simpler since the light rays are not altered except in intensity.

While the device has been illustrated as having a flat reflecting surface, it will be obvious that the reflecting surface may take any desired configuration such as a spherical or parabolic surface, for example.

The device is particularly suitable as a rear view mirror in motor vehicles for night driving. It is possible by the use of the device to reduce the intensity of reflected light from headlights of a following vehicle to a desired degree by merely coloring the electrochromic layer. This can be done by mere switching and is thus quick and effective.

While certain specific embodiments and preferred modes of practice of the invention have been described, this is solely for illustration, and it will be obvious that various changes and modifications may be made without departing from the spirit of the disclosure or the scope of the appended claims.

We claim:

1. A radiation reflective device having an electric field responsive radiation transmitting characteristic comprising:
   a. a pair of conductive electrodes between which an electric field is established;
   b. an insulating material consisting essentially of beta-alumina in contact with one of said electrodes; and
   c. a persistent electrochromic material in contact with said insulating material and disposed between said electrodes wherein said electrode in contact with the insulating layer is a light reflecting layer of evaporated sodium and the other of said electrodes is substantially transparent.

2. A radiation reflective device having an electric field responsive radiation transmitting characteristic comprising:
   a. a pair of conductive electrodes between which an electric field is established;
   b. a current carrier permeable insulator selected from the group consisting of inorganic compounds of Groups IA, IIA and IIIA and in contact with one of said electrodes,
   c. a persistent electrochromic material in contact with said insulating material and disposed between said electrodes, wherein said electrode in contact with the insulating layer is a light reflecting layer of evaporated sodium and the other of said electrodes is substantially transparent.

3. The device of claim 2 wherein said persistent electrochromic material is tungsten oxide.

4. The device of claim 2 wherein said persistent electrochromic material is molybdenum oxide.

5. A radiation reflective device having an electric field responsive radiation transmitting characteristic comprising, in sandwich arrangement layers in contiguous contact in the following order:
   a. an electrode comprising as a reflective material, an alkali metal or doped conducting metal oxide,
   b. a current carrier permeable insulator selected from the group consisting of colorless solid ionic conductors having bulk ionic conductivities greater than $10^{-6}$/ohm/cm, said reflecting electrode and insulator having chemical and electrochemical compatibility,
   c. a persistent electrochromic material,
   d. a transparent electrode.

6. A variable light transmission device as defined in claim 5 comprising:
   control means coupled to said device for selectively applying across said electrodes a potential of one polarity, a potential of opposite polarity and an effective short circuit.

7. The device of claim 6 wherein at least one of the selectively applied potentials is variable over a given range.

8. A radiation reflective device having an electric field responsive radiation transmitting characteristic comprising, layers in contiguous contact in the following sandwich arrangement:
   a. an electrode comprising as a reflecting material, an alkali metal,
   b. a current carrier permeable insulator selected from the group consisting of alkali and alkaline earth metal oxides, or mixtures thereof, in combination with aluminum oxide, said reflecting electrode and insulator having chemical and electrochromical compatibility,
   c. a persistent electrochromic material selected from the group consisting of metal stannates, oxides and sulfides of metals of Groups IV B, V B and VI B of the Periodic System, and Lanthanide series metal oxides and sulfides, and,
   d. a transparent electrode.

* * * * *